US011707048B2

(12) United States Patent
Lindvall

(10) Patent No.: US 11,707,048 B2
(45) Date of Patent: Jul. 25, 2023

(54) SCRAPER FOR AN ENDLESS, MOVING ANIMAL RETENTION FLOOR, A FLOOR FOR ANIMAL RETENTION AND AN ANIMAL RETENTION FACILITY

(71) Applicant: LINDVALLS PATENTBOLAG AB, Visby (SE)

(72) Inventor: Tommy Lindvall, Visby (SE)

(73) Assignee: LINDVALLS PATENTBOLAG AB, Visby (SE)

( * ) Notice: Subject to any disclaimer, the term of this patent is extended or adjusted under 35 U.S.C. 154(b) by 255 days.

(21) Appl. No.: 16/332,273

(22) PCT Filed: Sep. 4, 2017

(86) PCT No.: PCT/SE2017/050876
§ 371 (c)(1),
(2) Date: Mar. 11, 2019

(87) PCT Pub. No.: WO2018/052358
PCT Pub. Date: Mar. 22, 2018

(65) Prior Publication Data
US 2019/0216043 A1 Jul. 18, 2019

(30) Foreign Application Priority Data
Sep. 15, 2016 (SE) .................................. 1651233-7

(51) Int. Cl.
*A01K 1/01* (2006.01)
*A01K 1/02* (2006.01)

(52) U.S. Cl.
CPC .............. *A01K 1/0135* (2013.01); *A01K 1/02* (2013.01)

(58) Field of Classification Search
CPC .. A01K 1/0128; A01K 1/0132; A01K 1/0117; A01K 1/0135; A01K 1/01;
(Continued)

(56) References Cited

U.S. PATENT DOCUMENTS 348,782 A * 9/1886 Sawyer .................. E04F 15/10
52/177
448,923 A * 3/1891 Kase et al. ............. B65G 45/00
198/499
(Continued)

FOREIGN PATENT DOCUMENTS

CN 201849923 U 6/2011
DE 20318782 U 4/2005
(Continued)

OTHER PUBLICATIONS

International Search Report and Written Opinion regarding International Application No. PCT/SE2017/050876, dated Nov. 27, 2017, 14 pps.
(Continued)

*Primary Examiner* — Joshua J Michener
*Assistant Examiner* — Carly W. Lynch
(74) *Attorney, Agent, or Firm* — Foley & Lardner LLP

(57) ABSTRACT

A scraper for an endless and moving animal retention floor is provided with elevations from the base surface of the animal retention floor. The scraper is formed with elastic tongues, each one of which is fixed to a base part, which extend out from the base part and are terminated with a free end. The scraper is fitted in relation to the moving animal retention floor so that the free ends of the tongues connect both against the base surface of the animal retention floor and against the elevations thereof for a scraping function in the motion of the animal retention floor.

18 Claims, 2 Drawing Sheets

(58) Field of Classification Search
CPC .......... A01K 1/02; B65G 45/16; B65G 45/12; B65G 15/42; B65G 15/44; B65G 45/14
See application file for complete search history.

(56) References Cited

U.S. PATENT DOCUMENTS

| | | | |
|---|---|---|---|
| 1,177,695 | A | 4/1916 | Gable |
| 2,810,467 | A * | 10/1957 | Stanislaus ................ A24B 3/00 198/525 |
| 3,274,973 | A | 9/1966 | Woods et al. |
| 3,694,068 | A | 9/1972 | Jordan |
| 3,699,926 | A * | 10/1972 | Stockl ................ A01K 1/0157 206/0.8 |
| 3,793,988 | A | 2/1974 | Traeger |
| 4,047,452 | A | 9/1977 | Eddy |
| 4,202,437 | A * | 5/1980 | Gordon ................ B65G 45/12 15/256.5 |
| 4,658,949 | A * | 4/1987 | Reicks ................ B65G 45/12 198/497 |
| 4,974,831 | A | 12/1990 | Dunham |
| 4,984,810 | A | 1/1991 | Stearns et al. |
| 5,104,844 | A | 4/1992 | Yamamoto et al. |
| 5,184,988 | A | 2/1993 | Dunham |
| 5,596,949 | A | 1/1997 | Fanguy |
| 5,816,190 | A | 10/1998 | Van Der Lely |
| 6,076,656 | A * | 6/2000 | Mat ................ B65G 45/16 198/499 |
| 6,237,536 | B1 | 5/2001 | Lindvall |
| 6,619,469 | B2 * | 9/2003 | Malmberg ............ B65G 45/00 198/497 |
| 6,823,983 | B2 * | 11/2004 | DeVries ................ B65G 45/16 198/499 |
| 7,051,680 | B2 | 5/2006 | Lindvall |
| 7,287,641 | B2 | 10/2007 | Lindvall |
| 7,507,187 | B2 | 3/2009 | Dyer |
| 9,010,275 | B2 | 4/2015 | Lindvall |
| 2002/0175055 | A1 * | 11/2002 | Ryde ................ B65G 15/42 198/690.2 |
| 2004/0069598 | A1 | 4/2004 | DeVries |
| 2004/0112716 | A1 | 6/2004 | DeVries et al. |
| 2009/0133990 | A1 * | 5/2009 | Metzner ................ B65G 45/12 198/497 |
| 2011/0192705 | A1 * | 8/2011 | Kotze ................ B65G 45/12 198/497 |
| 2014/0076358 | A1 | 3/2014 | Irwin |

FOREIGN PATENT DOCUMENTS

| | | | |
|---|---|---|---|
| EP | 1466651 A1 | 10/2004 | |
| FR | 2488487 A1 | 2/1982 | |
| GB | 2076352 A * | 12/1981 | ............ B65G 45/12 |
| JP | 2014-043332 A | 3/2014 | |
| JP | 2014-043332 A | 3/2014 | |
| KR | 20120063379 A | 6/2012 | |
| SE | 508770 C2 | 6/1998 | |
| WO | WO 96/09756 A1 | 4/1996 | |
| WO | WO-0170604 A1 * | 9/2001 | ............ B65G 45/12 |
| WO | WO2004/035428 A2 | 4/2004 | |
| WO | WO 2010/057238 A2 | 5/2010 | |
| WO | WO 2010/078158 A1 | 7/2010 | |

OTHER PUBLICATIONS

International Search Report and Written Opinion regarding PCT/SE2012/051046, dated Jan. 4, 2013, 11 pages.
International Search Report and Written Opinion regarding International Appl. No. PCT/SE2016/050653, dated Sep. 12, 2016, 10 pps.
Extended European Search Report regarding European Pat. App. No. 16821735.4, dated Feb. 11, 2019, 8 pps.
Machine translation of Office Action regarding corresponding Chinese Application No. 201780056749X, dated Jan. 29, 2021, 5 pps.
Design Manual; Year 2001. 6 Pages.
Second Office Action and its machine translation regarding corresponding Chinese Appl. No. 201780056749.X, dated Sep. 10, 2021, 19 pps.

* cited by examiner

SCRAPER FOR AN ENDLESS, MOVING ANIMAL RETENTION FLOOR, A FLOOR FOR ANIMAL RETENTION AND AN ANIMAL RETENTION FACILITY

TECHNICAL FIELD

The present invention relates to floors intended for animal retention facilities. One type of said floors comprises an, endless, mat which is driven either continuously or intermittently in a direction for, for instance, removal of dung from the floor and for supply of bedding and/or animal fodder onto the same. Particularly, this invention concerns a scraper for such a mat and such a floor.

BACKGROUND OF THE INVENTION

Background of the invention is seen, among others, in the Swedish patent application SE 9604750-1 having the publication number SE 508770, corresponding to U.S. Pat. No. 6,237,536. This publication shows an animal box for breeding having a floor in the form of an endless belt, which is intermittently moving in the longitudinal direction of the box. The same publication also shows that a sprayer device is arranged for cleaning the endless belt but also that a scraper tool may be arranged adjacent to the belt to remove animal dung from the same. These endless floors having some form of scraper tool are flat so that the scraping tool could connect to the surface.

Such floors tend to become slippery and therefore the animals setting foot upon the floor may slip and hurt themselves. Thus, such floors have to be anti-slip. A solution to form the floors anti-slip is to provide them with a rough coating, but also then the animals may slip if the roughness is clogged by the dung. To also solve this problem, the floor may be provided with elevations distributed across the floor surface, which cannot be clogged in a similar way as a rough floor.

Such a floor having elevations distributed across the floor surface cannot be provided with a conventional scraper because the floor surface assumes several different levels in the horizontal plane, which levels are not reached using such a previously known scraper.

SUMMARY

The object of the present invention is to provide a scraper for a floor for animal retention, which solves the problems which arise when the floor assumes different horizontal levels, particularly, in connection with floors for pig breeding.

Furthermore, the object is to provide a floor for animal retention provided with such a scraper.

In addition, the object is to provide an animal retention facility comprising such a floor.

By the present invention, such as this is seen in the independent claims, the above-mentioned object is met, wherein said disadvantages have been eliminated. Suitable embodiments of the invention are defined in the dependent claims.

The invention concerns a scraper for a mat for a floor for animal retention, which floor is formed with a defined longitudinal direction.

Particularly, the invention concerns a scraper for an endless and moving animal retention floor provided with slip-reducing means in the form of elevations from the base surface of the animal retention floor. The scraper is formed with elastic tongues, each one of which is fixed to a base part and each one of which extends out from the base part and is terminated with a free end. The scraper is fitted in relation to the moving animal retention floor so that the free ends of the tongues connect both against the base surface of the animal retention floor and against the elevations thereof for a scraping function in the motion of the animal retention floor. The fixation to the base part is preferably arranged permanently by the fact that the tongues and the base part are manufactured in one piece from which a machining, for instance in the form of punching, has been made by gaps having been produced to form the tongues. Other designs of the tongues may be made by the fact that the tongues either together or in groups or separately are connected to a separate base part which is fitted at a suitable angle in relation to the endless floor.

In one embodiment of the invention, the tongues and the base part, when the tongues are unloaded, are situated in the same plane.

In one embodiment of the invention, the base part forms, when the scraper is fitted, an angle $\alpha$ between the base part and a normal to the base surface of the animal retention floor, wherein $0° \leq \alpha \leq 90°$.

In one embodiment of the invention, the scraper is fitted in a foundation, which also supports the moving animal retention floor and which scraper is oriented with its extension perpendicular to the direction of motion of the animal retention floor, i.e., $\alpha=0°$.

Also embodiments having two or more scrapers fitted in the same angle or in different angles in relation to the animal retention floor are feasible within the scope of the invention.

In one embodiment of the invention, the elastic tongues are of steel. The thickness of the tongues is preferably 2.0-5.0 mm.

The outer ends of the tongues are roundly shaped in order to co-operate with the surfaces of the floor in the best way. The corner of the respective tongue that is closest abutting against the floor and the base surface thereof has a radius R of 0.1-5.0 mm, preferably 1.0 mm for tongues having the thickness of 2.0 mm and preferably 2.5 mm for tongues having the thickness of 5.0 mm. Also a flat chamfer having a symmetrically leaning surface may be conceivable as an alternative to the rounded shape.

The invention also concerns a floor for animal retention, the floor comprising a mat provided with a base surface, which mat is endlessly formed and provided with elevated slip-reducing means and which mat extends around a cylindrical drive roller driven by a driving means for a continuous or intermittent driving of the mat in its longitudinal direction and to which floor a scraper provided with elastic tongues is fitted according to any one of the designs indicated and presented above and the elastic tongues of which abut on one hand against the base surface of the mat and on the other hand against the slip-reducing means.

In addition, the invention also concerns an animal retention facility comprising a floor according to what has been presented above.

The mat constituting a part of the floor preferably comprises a liquid-impermeable support layer onto which a wear layer is applied. The support layer can be imposed an intermittent bending, which means that the mat from a flat state is imposed a bending so as to then reassume a flat state and so on. Above the support layer, a wear layer is applied. The floor surface is in addition provided with different types of slip-reducing means one type of which is protuberances placed on the surface of the mat in an optional pattern. Preferably, this pattern gives an indication of bending lines, bending grooves, or bending bands, which facilitate the bending in contrast to areas by the side of these lines or bands where the bending is almost non-existent. The scraper that the present invention concerns is extraordinarily suited for abutting against the wear layer as well as protuberances of such a mat.

As support layer, experiments have been made with HDPE in a thickness of 1.73 mm with a density of 0.957 g/cm$^3$, which material has turned out to work well for a floor according to the invention and which floor also has been tested for pigs.

As wear layer, in these experiments a plastic mix called thermoplastic polyolefin, TPO, has been used, which is a heated plastic compound which obtains properties corresponding to rubber. TPO is a form of TPE mix which stands for "thermoplastic elastomers". TPO is characterized in that it has an oil base and is often called polymer alloy. TPO is generally harder than thermoplastic elastomers, TPE. In TPO, different plastics, such as polyethylene, PE, and polypropylene, PP, may be mixed. In these experiments, both virgin and recycled PP were mixed in. The thickness of the wear layer was 0.28 mm.

Preferably, a structure is provided on the mat by rolling according to any one of the following two methods:
a) PE-AR (anti-slip) co-extruded layers with the same fragmentation of the individual layers. This method affords an anti-slip structure solely on the upper surface. A PE layer with a top layer that is co-extruded and in that connection is fed through a profile where the layers are pressed together. The material compositions are of the above-mentioned kinds.
b) PE-TPE mono-extruded layer having anti-slip properties all through the thickness. The layers are created by heating the plastic mix and then pressing it through a mould.

Thus, the mat may be produced either with a wear layer having anti-slip material or through-out with anti-slip material. The total thickness of the mat will be in the interval of 2.5-10 mm, preferably 2.5-3.5 mm.

Irrespective of which type of mat that is used, a scraper according to the invention constitutes to remove dirt and the like from both the wear layer and the protuberances placed on the wear layer.

BRIEF DESCRIPTION OF THE DRAWINGS

Now, the invention will be described in more detail, references being made in connection with the accompanying drawing figures. The drawing figures show only explanatory sketches intended to facilitate the understanding of the invention.

DETAILED DESCRIPTION OF THE INVENTION

Figure 1:
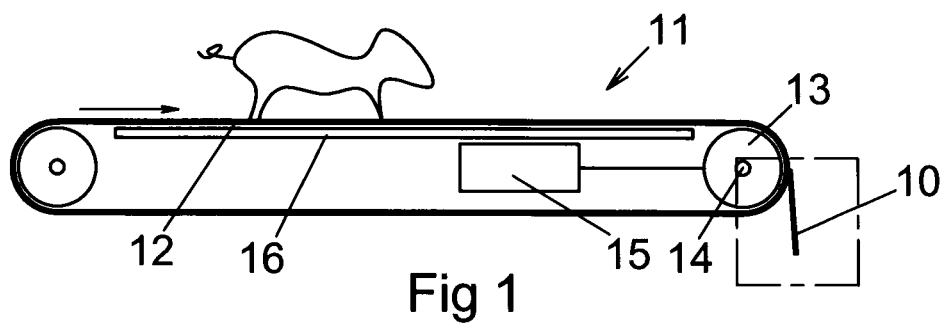
FIG. 1 shows a driven floor for animal retention according to the invention.

FIG. 1 shows a floor 11 for an animal retention facility. The floor comprises an endless mat 12, which is continuously or intermittently driven in a direction according to the arrow to transport away animal dung and possibly also to supply bedding to the floor. To the floor, a scraper 10 is connected to scrape contaminants of excrements and dirty bedding off the mat. Also a supplementing cleaning by water or air may be used. In addition, there is support means 16 which supports the mat 12 to avoid deflection from the weight of one or more animals along the extension of the mat. One end of the floor 11 is provided with a drive roller 13 inside the mat, which drive roller drives the mat by friction against the drive roller. The drive roller is journalled for rotation on a centre shaft 14. The drive roller is driven by a driving means 15, which may be an electric motor connected to the drive roller 13 in a suitable way. Also other ways to drive the drive roller are possible.

Figure 3A:
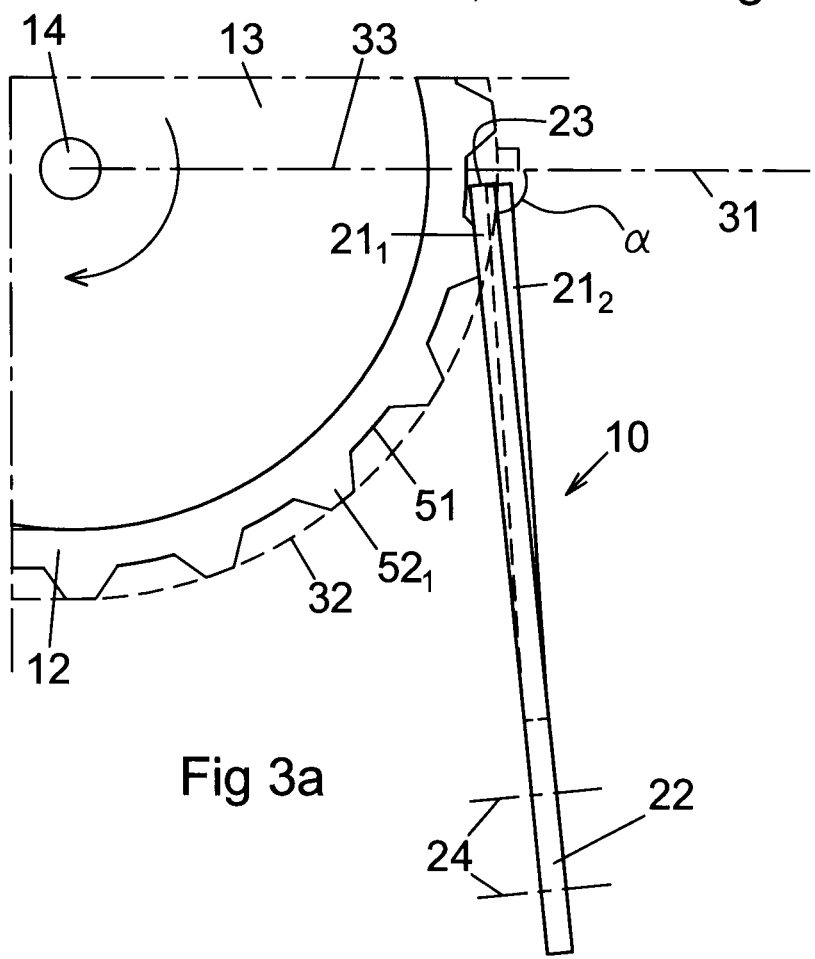
FIG. 3a shows an enlargement according to the marking in FIG. 1.

"In FIG. 1, an area has been marked, which will be shown in enlargement in FIG. 3a."

Figure 2:
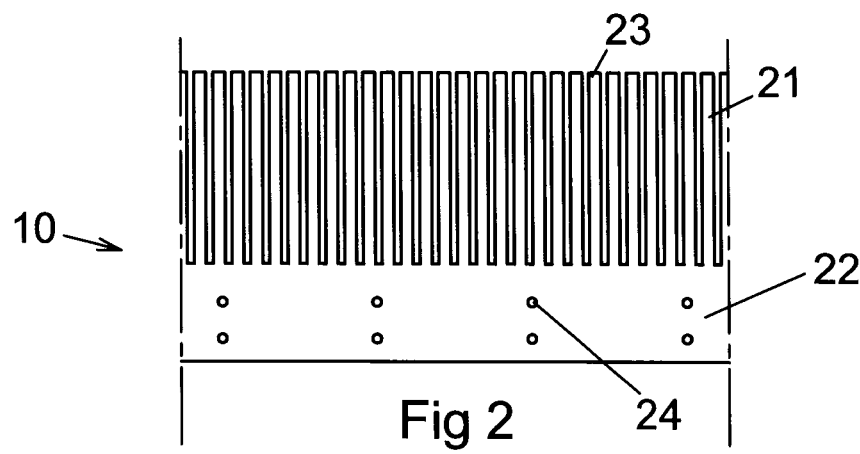
FIG. 2 shows a front view in enlargement of a scraper according to FIG. 1.

FIG. 2 shows an enlargement of a part of the scraper 10, which is provided with elastic tongues 21, each one of which in its one end is fixed to a flat base part 22 and the other end of which constitutes a free elastically resilient end 23. The tongues are parallel to each other and the distance between two adjacent tongues is 1-5 mm. The length of the tongues is equal and is between 50-100 mm. The scraper is provided with fitting means 24, for instance in the form of screw holes, to fit the base part 22 of the scraper in a foundation with suitable distance and angle in relation to the mat.

FIG. 3a shows an enlargement from FIG. 1 of the connection of the scraper 10 against the endless mat 12 when the same bends around the drive roller 13. The mat is provided with a base surface 51 from which slip-reducing means $52_1$ extend outward from the base surface 51. Against the base surface 51 and against the slip-reducing means $52_1$, the elastic tongues $21_1$, $21_2$ of the scraper 10 abut with the free ends 23 thereof, the tongues $21_1$ of which in unsprung state abut against the base surface 51 and the tongues $21_2$ of which in sprung state abut against the slip-reducing means $52_1$. The bending line of the slip-reducing means $52_1$ has in the figure been marked by a dashed curving line 32. "The angle $\alpha$ between a normal 31 to the base surface 51 and the base part 22 of the scraper falls in the interval of $0° \leq \alpha \leq 90°$, and for the shown fitting in the interval of 65-85°, preferably 85° if the tongues connect at the bending of the mat in the area of an imaginary horizontal line 33 out from the centre shaft 14 of the drive roller." The direction of rotation and the direction of motion, respectively, of the mat 12 are shown by an arrow in the figure. Furthermore, the fitting means 24 are outlined in the figure.

Figure 3B:
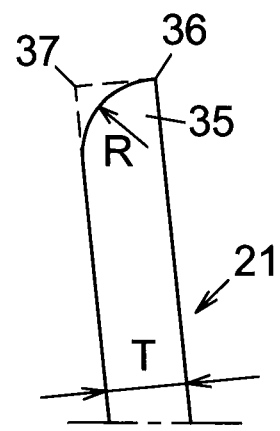
FIG. 3b shows an enlargement of the outer end of a tongue.

FIG. 3b shows an enlargement of the outer end 35 of a tongue 21, which possesses a sharp corner edge 36 on the side of the tongue that is facing away from the base surface of the mat and a rounded corner edge 37 having the radius R on the side of the tongue 21 that is facing the base surface of the mat. Said rounded corner edge has been given a radius that contributes to the tongue's end sliding without hindrance both downward toward the base surface and upward on the protuberances. The figure shows a radius R that is equal to the tongue's thickness T.

Figure 4:
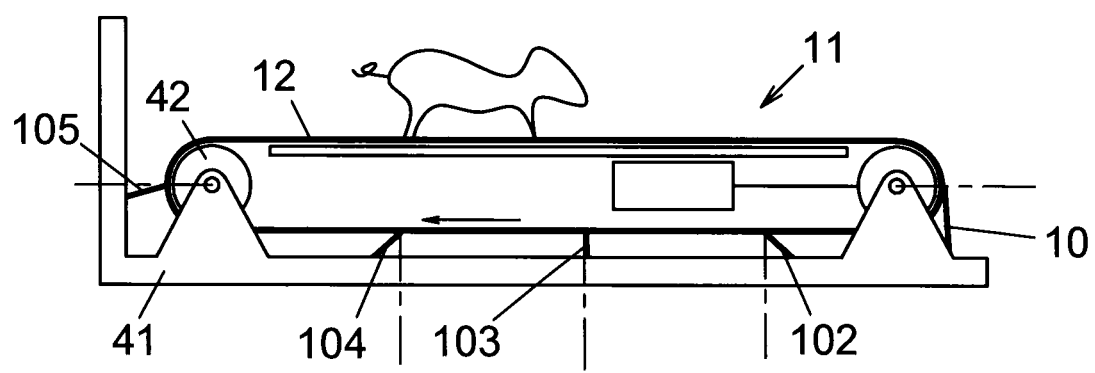
FIG. 4 shows alternative embodiments of the fitting of the scraper at the floor.

FIG. 4 shows a floor 11 having a mat 12 according to what has previously been shown and with alternative locations and directions of a scraper 10 according to the invention. The previously shown location of a scraper 10 has been connected to a foundation 41 which supports the floor 11 with the mat 12 and the bearings thereof. An alternative, second location of a scraper 102 has been made under the floor 11, which scraper 102 abuts against the horizontally moving part of the mat at an angle of 45° in relation to the normal of the mat with a direction of the tongues in the direction of the direction of motion of the mat, which is shown by an arrow in the figure. Normals to the mat are shown by centre lines in the figure. An alternative, third location of a scraper 103 has been made under the floor 11, which scraper 103 abuts against the horizontally moving part of the mat at an angle of 1° in relation to the normal of the mat, accordingly the scraper is fitted nearly perpendicular to the mat. An alternative, fourth location of a scraper 104 has been made under the floor 11, which scraper 104 abuts against the horizontally moving part of the mat at an angle of 45° in relation to the normal of the mat. In said fourth location, however, the tongues of the scraper are directed against the direction of motion of the mat, which gives an advantageous scraping effect by the fact that contaminants from the mat can fall freely straight down. An alternative, fifth location of a scraper 105 has been made at the cylindrical support roller 42 of the floor 11, which scraper 105 abuts against the bent moving base surface of the mat at an angle of 15° in relation to the normal of the mat. This fifth location of the scraper 105 affords a dragging scraping effect with good removal of the contaminants.

Figure 5:
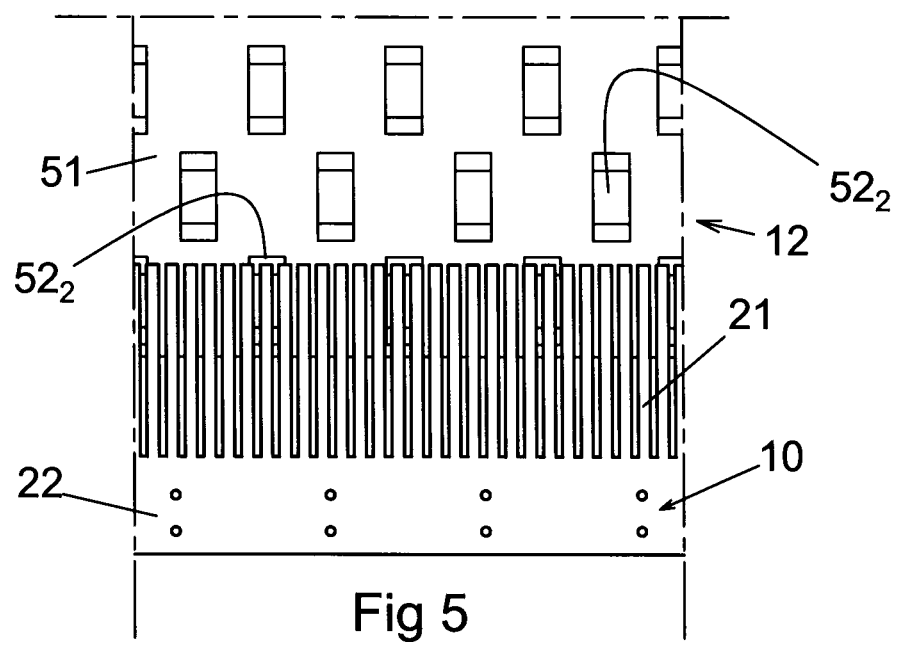
FIG. 5 shows a front view of a first fitting of a scraper according to the invention.

FIG. 5 shows a scraper 10 according to the first embodiment according to FIG. 1, which abuts against the mat 12 of the floor at an angle α of the base part 22 of the scraper to the normal of the mat in the interval of 65-85°, wherein most of the elastic tongues 21 abut against the base surface 51 of the mat while groups of 2-3 tongues abut springing outward against the slip-reducing means $52_2$, wherein all tongues 21 act for a scraping effect on the mat 12. In this embodiment shown, the slip-reducing means have been shown as rectangular elevations having sloping edges in the longitudinal direction of the floor. However, these elevations may be formed in other ways, for instance as rhombs having opposite acute angles, and placed in another symmetrical pattern across the base surface. Preferably, the location is such that transverse lines or bands are obtained so that these should constitute bending lines which should facilitate the bending over the rollers.

Figure 6:
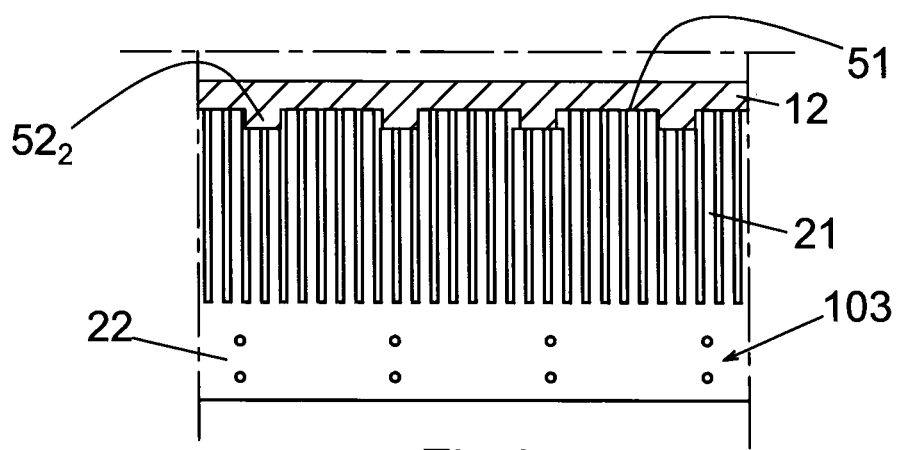
FIG. 6 shows in a section through the mat a front view of a second fitting of a scraper according to the invention.

FIG. 6 shows a section through the mat having a scraper 103 fitted according to the third embodiment according to FIG. 4 and which abuts against the mat 12 of the floor at an angle α to the normal of the mat in the interval of 0-5°. The groups of 2-3 tongues act scrapingly against the slip-reducing means $52_2$, the remaining tongues acting scrapingly against the base surface 51 of the mat 12. Also the fitting of the scraper in the second, the fourth, and the fifth embodiment may be represented by the fitting according to FIG. 6 but the base part 22 of the respective scraper 102, 104, 105 has then another angle to the normal of the mat, which is seen in FIG. 4.

In all embodiments, the fitting of the base part 22 of the scraper may be such that the elastic tongues 21 that abut against the base surface either abut planely unspringy or with a sprung abutment.

Furthermore, a floor may be provided with additionally one or more scrapers, which have been given properties concerning dimensions and elasticity to provide a supplementing cleaning. For instance, a first scraper 10 may be fitted according to FIG. 4 to remove coarser contaminants from the mat 12 and a second scraper 102 be fitted according to FIG. 4 to remove finer particles from the mat.

The elastic tongues 21 may be of a polymeric material but preferably stainless steel is used. The elastic tongues 21 are, as have been shown in the figures, punched from the same material blank in which the base part 22 is included, but according to other embodiments, the tongues may be separate or united and fitted to the base part 22.

Common to all embodiments is in addition that the mat may be provided with one or more types of slip-reducing structures placed on each other, by the side of each other, or a combination thereof.

Common to all embodiments is also that the mat is intended to be used in an intermittently moving floor for animal retention facilities having material properties which resist the abrasion and the wear that are present in these environments.

The invention claimed is:

1. A floor assembly for animal retention, the floor assembly comprising:
   a floor comprising:
      a cylindrical drive roller;
      a mat extending around the cylindrical drive roller, the mat endlessly formed and comprising a base surface and elevated slip-reducing means comprising elevations spaced apart in rows such that both (1) straight bending lines or bands are formed at first spaces separating the rows of the elevations and (2) second spaces within the rows separate the elevations within the rows, wherein the straight bending lines or bands are transverse to a direction of motion of the mat and facilitate bending of the mat about the cylindrical drive roller; and
      a driving means coupled to the cylindrical drive roller and configured to drive the cylindrical drive roller to provide a continuous or intermittent driving of the mat in a longitudinal direction; and
   a scraper comprising a base part and a plurality of elastic tongues, each elastic tongue extending from the base part to a free end of the elastic tongue;
   wherein the scraper is positioned such that the free ends of the elastic tongues contact both the base surface and the elevated slip-reducing means of the mat as the mat is driven about the cylindrical drive roller in a direction of motion, wherein the elastic tongues are integral with the base part;
   wherein the elastic tongues contact the mat at a bending of the mat and proximate a horizontal plane incident with a center shaft of the drive roller;
   wherein the tongues of the scraper are directed against the direction of motion of the mat; and
   wherein the scraper is fitted such that the elastic tongues and the base part are disposed at an angle toward the drive roller within an interval of 65-85° relative to a normal of the mat and with the elastic tongues in contact with the base surface at the angle, the normal lying in the horizontal plane.

2. The floor assembly of claim 1, wherein the base part comprises fitting means fitted in a foundation such that the base part is disposed at a distance from the mat and at the angle toward the drive roller, wherein the scraper is oriented approximately perpendicular to the longitudinal direction.

3. The floor assembly of claim 2, wherein the base part and the elastic tongues are formed in one piece consisting solely of a polymeric material.

4. The floor assembly of claim 1, wherein the elastic tongues comprise steel.

5. The floor assembly of claim 1, wherein the free end of each elastic tongue comprises a corner edge which bears against the mat, each corner edge comprising a chamfer or a rounding.

6. The floor assembly of claim 1, wherein the second spaces are larger than the elevations.

7. The floor assembly of claim 6, wherein the rows of the elevations are staggered such that the elevations of a first row of the rows are aligned with the second spaces of a second row of the rows.

8. The floor assembly of claim 1, wherein the elevations are rectangular.

9. The floor assembly of claim 8, wherein the elevations have widths greater than widths of the elastic tongues.

10. An animal retention facility, comprising:
a floor comprising:
a cylindrical drive roller;
a mat extending around the cylindrical drive roller, the mat endlessly formed and comprising a base surface and elevated slip-reducing means comprising elevations spaced apart in rows such that both (1) straight bending lines or bands are formed at first spaces separating the rows of the elevations and (2) second spaces within the rows separate the elevations within the rows, wherein the straight bending lines or bands are transverse to a direction of motion of the mat and facilitate bending of the mat about the cylindrical drive roller; and
a driving means coupled to the cylindrical drive roller and configured to drive the cylindrical drive roller to provide a continuous or intermittent driving of the mat in a longitudinal direction; and
a scraper comprising a base part and a plurality of elastic tongues, each elastic tongue extending from the base part to a free end of the elastic tongue;
wherein the scraper is positioned such that the free ends of the elastic tongues contact both the base surface and the elevated slip-reducing means of the mat as the mat is driven about the cylindrical drive roller in a direction of motion, wherein the elastic tongues are integral with the base part;
wherein the elastic tongues contact the mat at a bending of the mat and proximate a horizontal plane incident with a center shaft of the drive roller;
wherein the tongues of the scraper are directed against the direction of motion of the mat; and
wherein the scraper is fitted such that the elastic tongues and the base part are disposed at an angle toward the drive roller within an interval of 65-85° relative to a normal of the mat and with the elastic tongues in contact with the base surface at the angle, the normal lying in the horizontal plane.

11. The animal retention facility of claim 10, wherein the base part comprises fitting means fitted in a foundation such that the base part is disposed at a distance from the mat and at the angle toward the drive roller, wherein the scraper is oriented approximately perpendicular to the longitudinal direction.

12. The animal retention facility of claim 11, wherein the base part and the elastic tongues are formed in one piece consisting solely of a polymeric material.

13. The animal retention facility of claim 10, wherein the elastic tongues comprise steel.

14. The animal retention facility of claim 10, wherein the free end of each elastic tongue comprises a corner edge which connects against the mat, each corner edge comprising a chamfer or a rounding.

15. The animal retention facility of claim 10, wherein the second spaces are larger than the elevations.

16. The animal retention facility of claim 15, wherein the rows of the elevations are staggered such that the elevations of a first row of the rows are aligned with the second spaces of a second row of the rows.

17. The animal retention facility of claim 10, wherein the elevations are rectangular.

18. The animal retention facility of claim 17, wherein the elevations have widths greater than widths of the elastic tongues.

* * * * *